United States Patent [19]

Bollinger

[11] 4,418,310

[45] Nov. 29, 1983

[54] BATTERY CHARGER CONTROL CIRCUIT

[75] Inventor: David D. Bollinger, Troy, Ohio

[73] Assignee: Hobart Brothers Company, Troy, Ohio

[21] Appl. No.: 322,333

[22] Filed: Nov. 18, 1981

[51] Int. Cl.³ .............................................. H02J 7/04
[52] U.S. Cl. ....................................... 320/39; 320/37
[58] Field of Search ...................... 320/20, 29, 30, 36, 320/37, 39

[56] References Cited

U.S. PATENT DOCUMENTS

| | | |
|---|---|---|
| 3,098,188 | 7/1963 | Dawkins . |
| 3,424,969 | 1/1969 | Barry . |
| 3,617,851 | 11/1971 | DuPuy et al. . |
| 3,794,905 | 2/1974 | Long . |
| 3,886,428 | 5/1975 | Macharg . |
| 3,895,282 | 7/1975 | Foster et al. ........................ 320/37 |
| 4,091,320 | 5/1978 | Foster . |
| 4,191,918 | 3/1980 | Nicholls ............................. 320/37 |
| 4,227,141 | 10/1980 | Cross . |
| 4,240,021 | 12/1980 | Kashima et al. ...................... 320/39 |

Primary Examiner—William M. Shoop
Assistant Examiner—Anita M. Ault
Attorney, Agent, or Firm—Biebel, French & Nauman

[57] ABSTRACT

An automatic battery charging apparatus is provided with a regulated battery charger (15) and a control circuit (20) for monitoring the actual voltage across the battery terminals to control the operation of contactor (25). The control circuit includes means (50) for sensing the average battery voltage at regular intervals and means (55, 60) for comparing successive average battery voltage readings. Whenever the present average voltage reading differs from the previous average battery voltage reading by less than a predetermined amount, a signal (63) is applied to a circuit (65), and whenever a predetermined number of consecutive voltage readings have been detected, a logic circuit (70) causes the contactor (25) to terminate the charging operation.

4 Claims, 16 Drawing Figures

FIG-15

BATTERY CHARGER CONTROL CIRCUIT

BACKGROUND OF THE INVENTION

This invention relates to an electronic battery charger control circuit. More particularly, this invention relates to a control circuit for a battery charger of the type designed to recharge lead acid batteries such as used in supplying power to electric vehicles, and for terminating the charging operation whenever the batteries are fully charged.

There are two important reasons for not overcharging a battery. The first reason has to do with the cost of electricity. Obviously, if a battery charger is operated beyond the point where the battery is fully charged, it is wasting energy and money. On the other hand, it is important that the battery become fully charged, otherwise it will not be ready for a full day's operation.

The other reason for not overcharging the battery has to do with battery life. Once a battery has become fully charged, applying further current to the battery causes both hydrogen and oxygen to be released from the electrolyte through the electrolysis process. The oxygen combines with the lead in the positive plates causing them to become soft and tend to fall apart, thus shortening battery life.

One typical prior art battery charger control circuit is essentially a timer which applies charging current to the battery for a specified period of time. If it is assumed that a battery becomes 80% or 90% discharged during the course of a typical 8-hour shift, and if the battery and the battery charger capacity are properly selected, then an 8-hour charge will usually put the battery back into condition for the next shift. However, if the battery is only 20% discharged, then a shortened charging time would be indicated, and if it were 100% discharged, then a longer charging time would be required.

In another prior art device, a voltage relay is used to sense the battery voltage, and when it has reached a predetermined level, to terminate the charging cycle. If the battery is defective in some way, the battery voltage might never reach the predetermined value.

In still another type of battery charger, the rate of change of battery voltage is used as a measure of the state of charge. However, variations in charging voltage, or noise on the output of the battery charger would adversely affect this type of measurement device, thus either shortening or prolonging the charging cycle.

SUMMARY OF THE INVENTION

This invention relates to an automatic battery charging apparatus wherein charging current to the battery will be terminated after the battery has become fully charged.

Battery charging current is provided by a regulated source of current, and both the voltage and the current output of the regulator are monitored by a control circuit. The actual voltage on the battery is measured as an indication of the state of charge, and when the rate of voltage change decreases, indicating the approach of a fully charged condition, the charging operation will thereafter be terminated.

This invention differs from the prior art in that the battery voltage is averaged over a period of time sufficient to ensure that momentary variations in the charger output voltage as well as ripple and other line noises are effectively filtered out, and that several consecutive average voltage measurements of less than a predetermined voltage are required before the charging operation is terminated.

In the preferred embodiment of this invention, an averaging analog to digital converter provides a digital output representative of the average battery voltage taken over a predetermined interval of time. The average voltage is then monitored at regular intervals, and the current reading is compared to a previous reading. If a predetermined number of consecutive comparisons reveals that there is a change in battery voltage of less than a predetermined amount, then a control signal is generated to disconnect the source of charging current to the battery.

The predetermined change in battery voltage required before termination is selected on the basis of the percent of recharge desired. In the preferred embodiment, a voltage change of less than 270 microvolts per minute per cell would indicate a recharge condition of 107% of the discharge ampere hours.

It is also a desire to terminate the charging cycle substantially immediately upon reaching a fully charged condition. In the preferred embodiment, termination within five to ten minutes after reaching a fully charged condition is substantially immediate, considering that a typical charging cycle is about eight hours in duration. This length of time allows several average battery voltage readings to be made, each average taken over a period of time long enough to ensure that momentary variations in charge output voltage may be ignored, and also to provide substantial noise immunity.

Requiring a plurality of consecutive voltage change indications of less than a predetermined amount also ensures or provides reliability and consistent operation of the charger. In a preferred embodiment, therefore, it will take over just four and a half minutes to terminate the charging operation once a fully charged condition has been indicated. This assures also that the change in voltage is due to the condition of the battery, and not arbitrary changes due to variations in the line voltage which is applied to the regulated charger.

Other means are also included to terminate the charging operation. For example, if a certain period of time has elapsed before the battery voltage reaches 2.4 volts-per-cell, then the charging cycle will be terminated since it is likely that there is a fault either in the battery charging circuit or within the battery itself. Also, if three hours have elapsed since the battery voltage exceeded 2.4 volts per cell, and four consecutive readings of less than a predetermined amount have not occurred, then charging operations will be terminated since there is likely to be a charger circuit failure. Further, if the charger current drops below a minimum value, then termination will occur since either the charger has failed or the battery has become disconnected from the charging circuit.

It is therefore an object of this invention to provide an automatic battery charging apparatus including means for providing a source of regulated electrical current for charging the battery, means for sensing the average battery voltage at regular intervals, means for comparing successive average battery voltage readings, means responsive to a predetermined number of consecutive comparisons of average battery voltage readings wherein the difference in the voltage measured is of less than a predetermined amount for generating a control signal, and means responsive to the control signal for disconnecting the source of charging current from the battery.

Other objects and advantages of the invention will be apparent from the following description, the accompanying drawings and the appended claims.

DESCRIPTION OF THE PREFERRED EMBODIMENT

Figure 1:
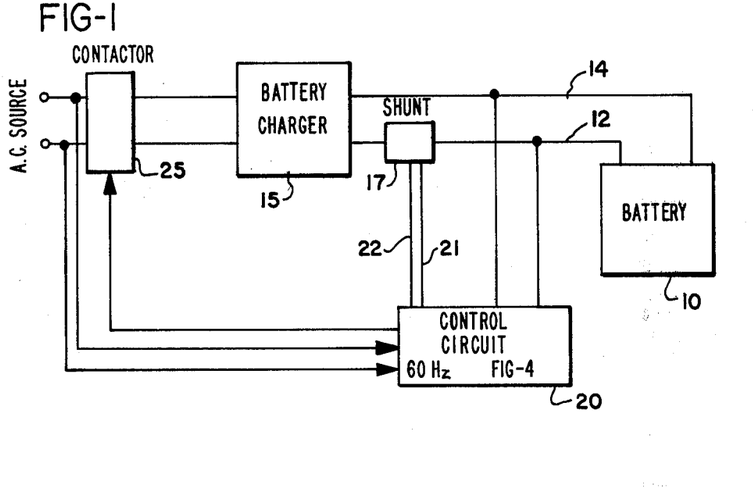
FIG. 1 is a generalized block diagram showing the arrangement of components used according to this invention to charge a battery.

Referring now to the drawings which show a preferred embodiment of the invention, and particularly to the block diagram of FIG. 1, a battery 10 is connected by wires 12 and 14 to a regulated battery charger 15. The charging current is monitored by a shunt 17 which is connected to control circuit 20 by wires 21 and 22. The charger 15 is preferably a regulated charger having a controlled output, such as the type described in U.S. Pat. No. 4,130,790. It is preferred that the charger be regulated to within one percent output voltage for as much as a ten percent change in the charger input voltage. The battery charger 15 is connected to a source of alternating current power through a contactor 25, the operation of which is controlled by the circuit 20.

Figure 2:
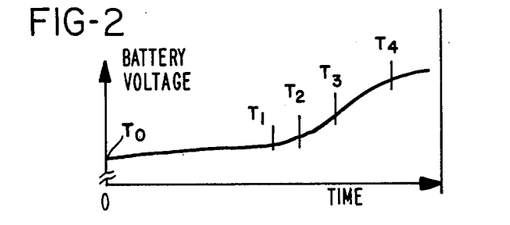
FIG. 2 is a curve showing the relationship between the voltage of a battery as it is being charged with respect to time.
Figure 3:
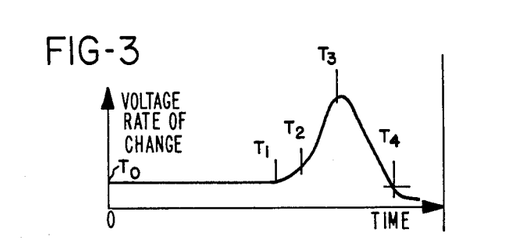
FIG. 3 is a curve showing the voltage rate of change of a battery undergoing charge with respect to time.

The charging curve of a lead acid battery is well known and is illustrated in FIGS. 2 and 3. As a lead acid battery becomes fully charged, the voltage rate of change decreases noticeably, and if means could be provided to sense when this decrease in voltage rate of change occurs, the charging operation could be terminated, thus saving the batteries from being overcharged, and also providing considerable savings in the cost of maintaining the batteries.

As illustrated in FIGS. 2 and 3, the battery voltage increases slowly from time T0 to time T1, and thereafter increases at a rapid rate until time T3, at which time the rate of battery change decreases, and when the rate of change decreases below a predetermined level, at T4, then the charging operation will be terminated.

The control circuit 20 includes means for sensing the battery voltage at regular intervals and further means for disconnecting the source of charging current from the battery whenever the rate of charge decreases below the aforesaid predetermined level. The control circuit also includes means for terminating the battery charger operation whenever the battery is disconnected and means for allowing the operator to manually interrupt the charging operation.

Figure 4:
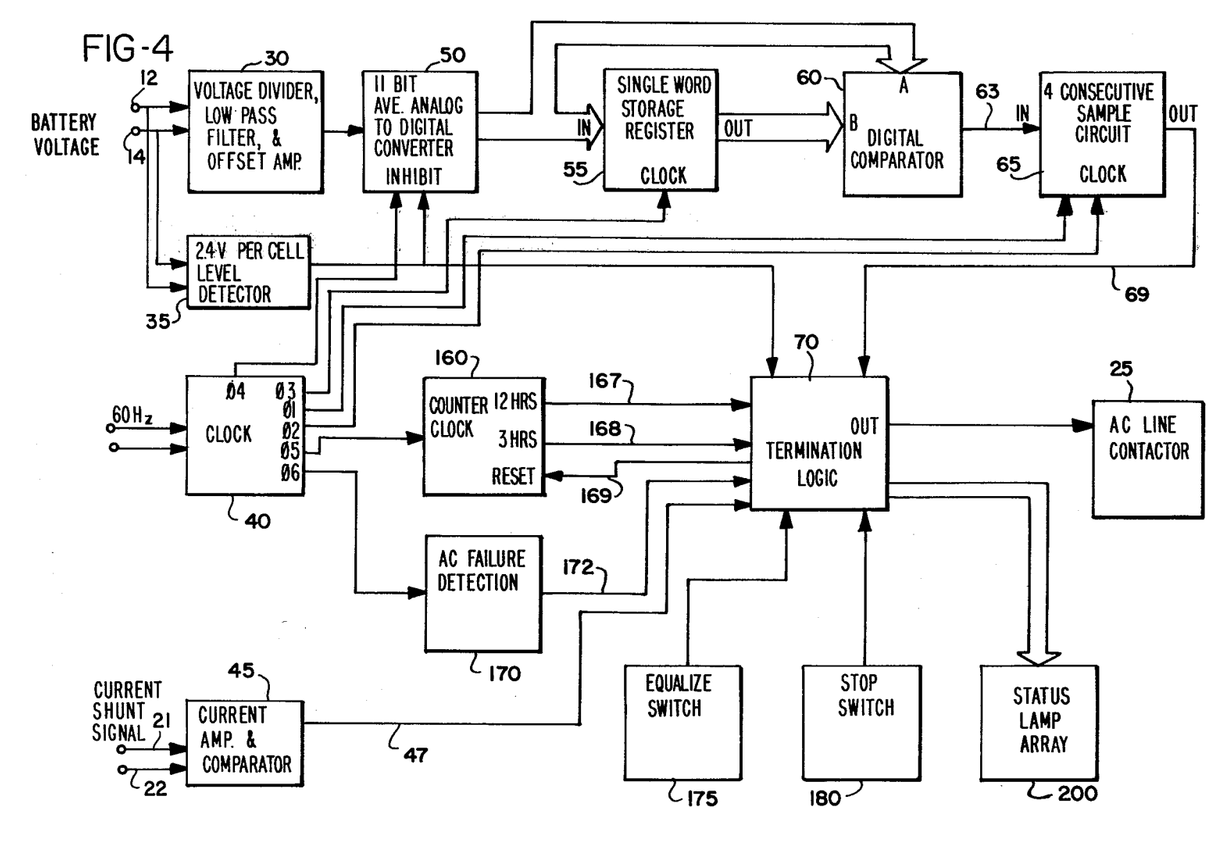
FIG. 4 is a block diagram showing the relationship of the components which comprise a control circuit constructed according to this invention.

The control circuit is shown in block diagram form in FIG. 4. This circuit includes a voltage divider, low pass filter and offset amplifier circuit 30 having an input connected to the battery by means of wires 12 and 14. Also connected to the battery is a 2.4 volt per cell level detector circuit 35. A source of commercial AC power is connected to a clock circuit 40, and the clock provides several outputs which control the timing of the remainder of the control circuit 20. The current shunt 17 is connected to a current amplifier and comparator circuit 45 by wires 21 and 22.

The control circuit 20 includes means for providing a digital output representative of average battery voltage taken over a predetermined period of time, and in the preferred embodiment of the invention, this means is in the form of an 11 bit averaging analog to digital converter 50 that provides a digital output to a single word storage register 55.

The control circuit also includes means for comparing successive average battery voltage readings, and this preferably is in the form of a digital comparator circuit 60 that compares the output from the single word storage register 55, representing the previous average battery voltage reading, with the present average voltage reading from the A/D converter 50.

The control circuit further includes means responsive to a predetermined number of consecutive comparisons of average battery voltage readings wherein the difference in voltage is less than a predetermined amount for generating a control signal. This means is in the form of a consecutive sample circuit 65. It receives as its input a signal from an output of the digital comparator 60 indicating that the difference between the present battery voltage and the previous battery voltage signal is less than a predetermined amount.

In the preferred embodiment, whenever three consecutive comparisons are made indicating that the battery voltage rate of change is less than a predetermined amount, then an ouput control signal is provided to a termination logic circuit 70 to cause the AC line contactor 25 to disconnect the source of charging current from the battery 10.

Figure 5:
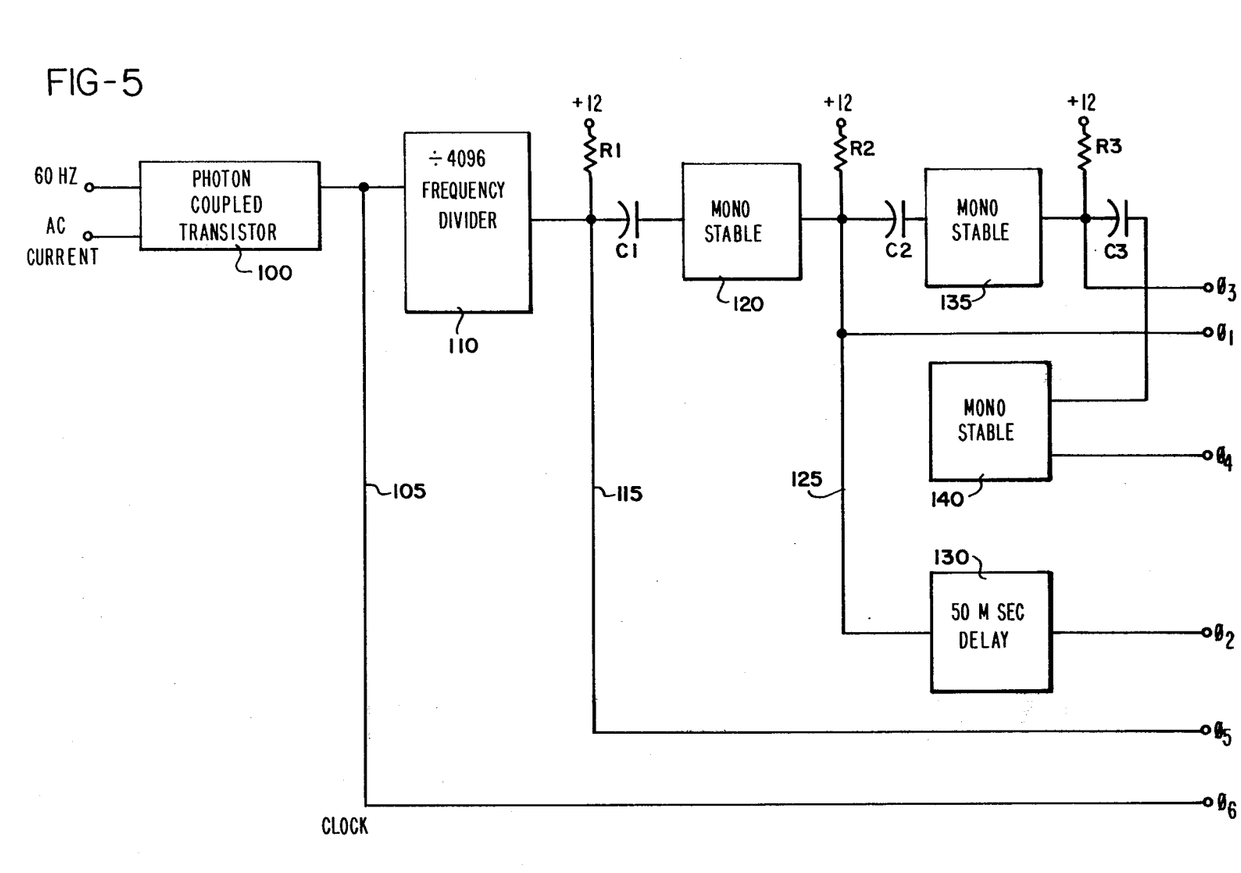
FIG. 5 is a block diagram of a clock which provides timing signals used by the control circuit.
Figure 6:
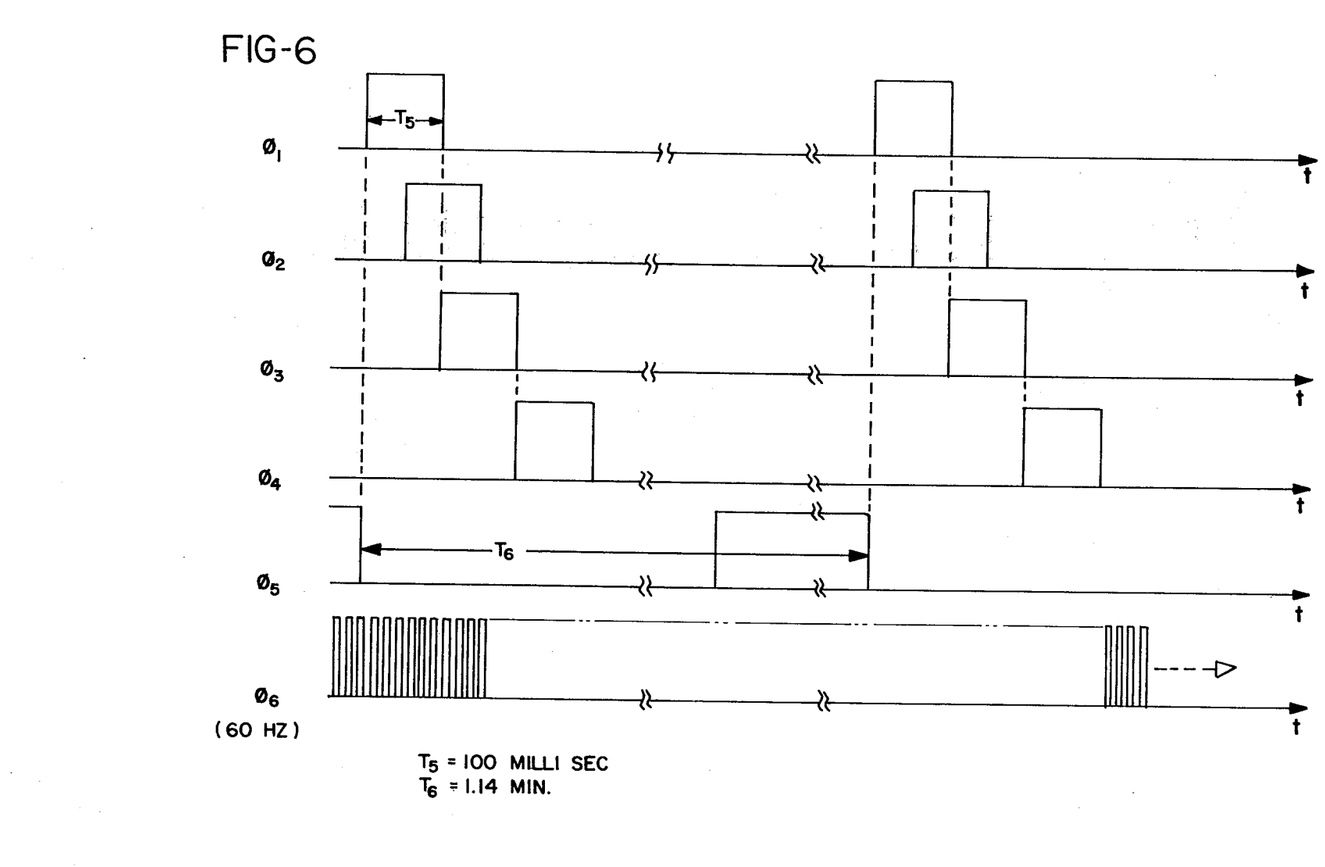
FIG. 6 is a timing chart illustrating the various output signals from the clock of FIG. 5.

Since the operation of the circuit of FIG. 4 is controlled in part by the clock 40, reference is now made to the block diagram of FIG. 5 and the timing chart of FIG. 6. The 60 cycle source of alternating current for the battery charger 15 is also coupled to the clock 40 through a photon-coupled transistor 100, one output of which is applied on line 105 directly to the $\phi 6$ terminal. As shown in FIG. 6, the $\phi 6$ output is a series of 60 cycle square wave pulses.

The photon-coupled transistor is also connected to a frequency divider circuit 110, which provides one output pulse for every 4096 input pulses, or in other words, each 1.14 minutes (T6). The output on line 115 is applied directly to the φ5 terminal and also through a coupling capacitor C1 to a monostable multivibrator 120, the output of which on line 125 is applied to the φ1 terminal and also to a 50 millisecond delay circuit 30 whose output is applied to the φ2 terminal.

The output of the multivibrator 120 is also applied through a capacitor C2 to a second monostable multivibrator 135, whose output is applied directly to the φ3 terminal and through capacitor C3 to a third monostable multivbrator 140, which provides the φ4 output. Each of the monostable multivibrators 120, 135 and 140 are triggered upon the trailing edge of the respective input pulse, and each generate a pulse having a width T5 of approximately 100 milliseconds in length.

The trailing edge of the φ5 signal from the frequency to divider 110 triggers multivibrator 120, which provides the φ1 output. The φ2 output is a 50 millisecond delay signal provided by the circuit 130. The trailing edge of the φ1 output triggers monostable 135, which provides the φ3 output, and the trailing edge of the φ3 pulse triggers monostable 140, which provides the φ4 output.

Thus, each of the φ1, φ2, φ3, φ4 and φ5 outputs are of the same frequency, but the output pulses appearing thereon appear at different times. These timing pulses are used to control the sequence of operation of the various circuits which comprise the control circuit 20 shown in FIG. 4.

Figure 7:
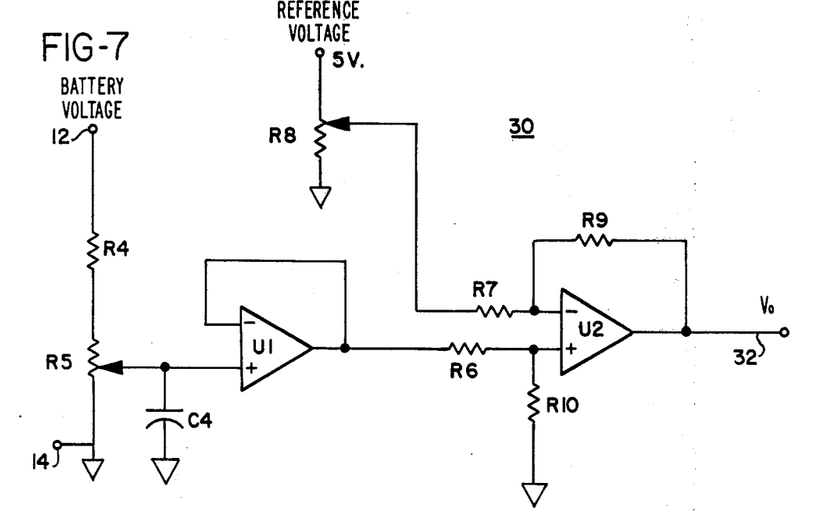
FIG. 7 is an electrical schematic diagram of a voltage divider, low pass filter and offset amplifier used in connection with this invention.

Referring now to FIG. 7, which illustrates a voltage divider, low-pass filter and offset amplifier circuit 30, the voltage across the battery 10 is applied to a voltage divider network comprising resistor R4 and potentiometer R5, and a portion of that voltage is taken from the wiper of potentiometer R5 and applied to amplifier U1, an operational amplifier connected in a buffer configuration. The low-pass filter portion of this circuit includes capacitor C4 which is connected between the input of the amplifier and ground.

The value of resistor R4 and the setting of potentiometer R5 are selected to provide an output from amplifier U1 which represents two times the battery voltage divided by the number of cells in the battery. Typically, the battery cell voltage of interest is between 2.4 and 2.65 volts-per-cell, and therefore the input to resistor R6 connected to the positive terminal of the offset amplifier U2 will range from 4.8 to 5.3 volts. The input to resistor R7 is a reference voltage of 4.7 volts obtained from the wiper of potentiometer R8 which has its input connected to a temperature compensated, calibrated 5 volt reference source.

The amplifier U2 is connected as a differential amplifier to provide a gain of approximately 16 (R9/R7) and its output VO on line 32 is applied as an input to the analog to digital converter 50.

The circuit of FIG. 7 is therefore a means for applying to the remainder of the circuit a signal representative of battery voltage but expanded in the range of battery voltages of particular interest. For example, battery voltages of less than 2.4 volts-per-cell are not of interest, since they indicate a battery in a discharged condition, and it is unlikely that battery voltages will exceed 2.65 volts-per-cell. Therefore, the range of voltages VO on line 32 will vary from 0 to 10 volts to represent a change of 0.30 volts-per-cell at the battery.

Figure 8:
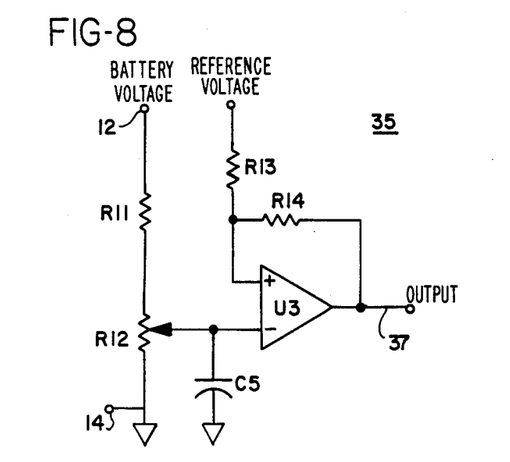
FIG. 8 is an electrical schematic diagram showing a 2.4 volt per cell level detector.

FIG. 8 is a schematic diagram of the voltage level detector 35. This circuit provides an output whenever the battery voltage represents an average of 2.4 volts-per-cell or above. As in FIG. 7, the battery is connected between terminals 12 and 14, and a voltage divider network including resistor R11 and potentiometer R12 takes a portion of that voltage and applies it as an input to the amplifier U3 which is an operational amplifier connected as a comparator. Capacitor C5 acts as a low-pass filter to smooth the input to the amplifier. A reference voltage is provided through resistor R13, and a feedback is provided through resistor R14. The output of the amplifier U3 is low, or 0 volts, until the voltage at the wiper of potentiometer R12 exceeds the reference, or until the average battery voltage exceeds 2.4 volts-per-cell. When this condition is met, the output on line 37 will go high, or to 12 volts, indicating that the condition has been met. This output is applied on line 37 to the termination logic circuit 70.

Figure 9:
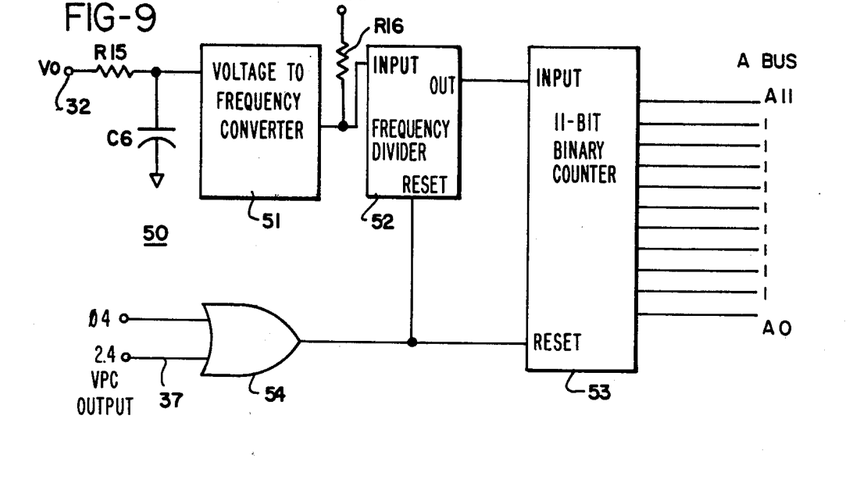
FIG. 9 is a simplified block diagram of an averaging analog to digital converter.

FIG. 9 is a block diagram of the averaging analog to digital converter circuit 50 which accepts an expanded analog input VO on line 32 and applies this voltage through a low-pass filter, including resistor R15 and capacitor C6, to a voltage-to-frequency converter circuit 51.

The voltage to frequency converter provides a noise rejection ratio in the order of 20$db$ per decade. Since the sampling interval in the preferred embodiment is 1.14 minutes, any 120 cycle ripple on the charger output would be attenuated by approximately 78$db$.

Voltage-to-frequency converter 51 accepts a voltage in the range of 0 to 10 volts, which represents a battery voltage of 2.35 to 2.65 volts-per-cell, and provides an output frequency in the range of 0 to 960 Hz. The frequency output of the converter 51 is applied as an input to frequency divider 52, a divide by 16 device, and it provides an output to an 11-bit binary counter 53. Both the frequency divider 52 and the binary counter 53 are reset upon the occurrence of a φ4 signal from the clock 40, or they are held in a reset condition whenever the average voltage-per-cell is below 2.4, as indicated by a signal on line 37 from the circuit 35 of FIG. 8. These reset inputs are applied to an OR gate 54, as shown in FIG. 9.

The voltage on line 32 is converted into a frequency by the converter 51, this is divided by the divider 52 and applied to the counter 53, and therefore the output of the counter 53 is an 11-bit digital signal on lines A0-A11 representing the average battery voltage integrated over the period of time between φ4 clock pulses, assuming of course that the average battery voltage is in excess of 2.4 volts.

Figure 10:
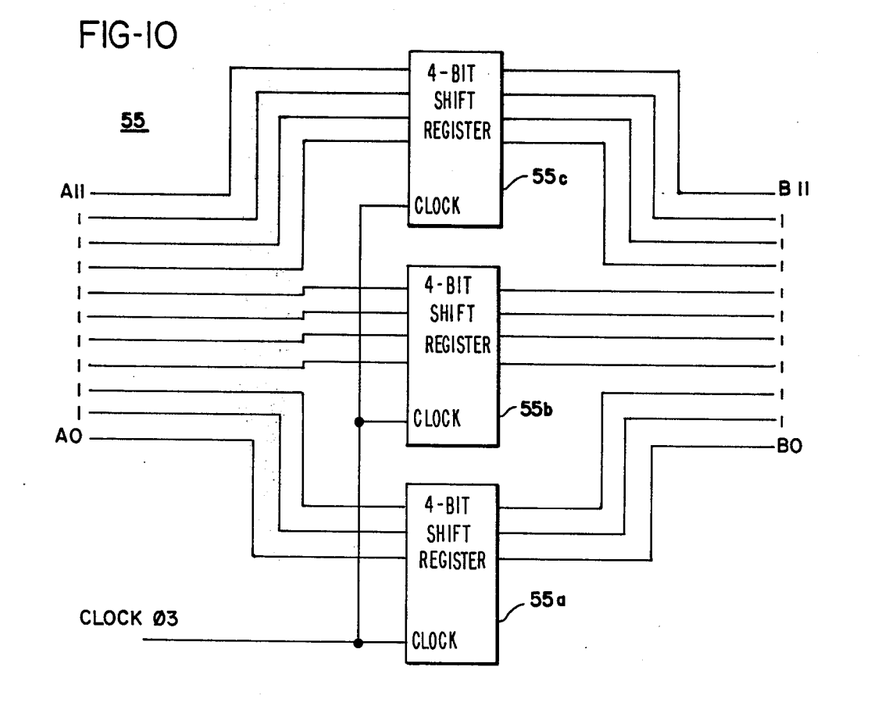
FIG. 10 is a block diagram of a single word storage register.

FIG. 10 is a block diagram of the single word storage register 55. The output of the counter 53 (A0-A11) is applied to three, 4-bit shift registers 55a–55c (MC14035). As shown, inputs A0-A2 are applied to register 55a, inputs A3-A7 are applied to register 55b, and inputs A8-A11 are applied to register 55c. Each of these registers is provided with a clock input so that they will record the binary number which is applied thereto on lines A0-A11 at the leading edge of the φ3 clock pulse. The output or the number stored in these registers is found on lines B0-B11. As explained previously, the digital output B0-B11 represents the previous battery voltage, whereas the input on lines A0-A11 represent the most current digital representation of battery voltage.

Figure 11:
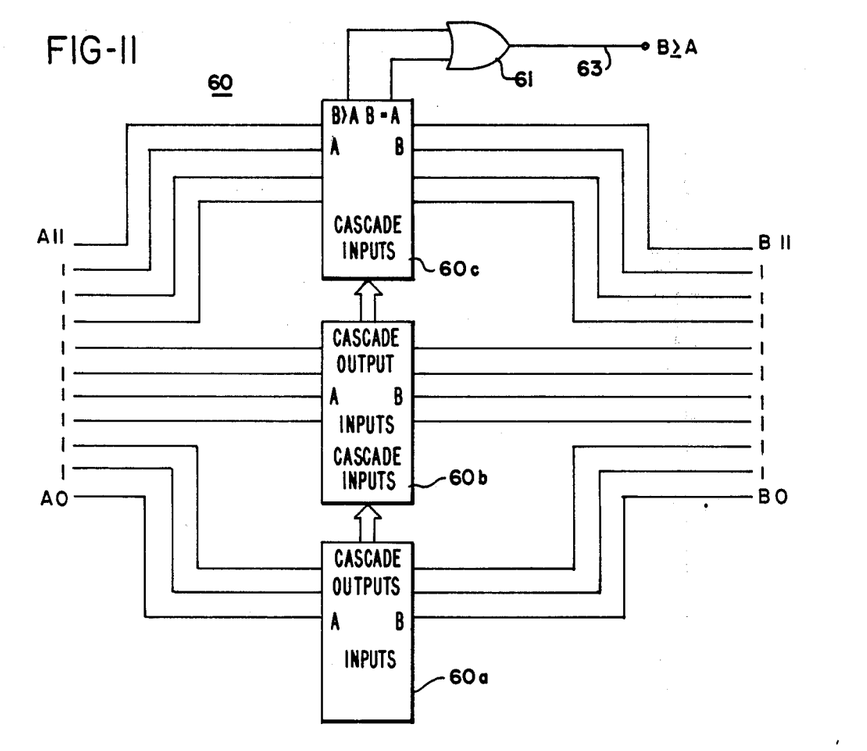
FIG. 11 is a block diagram of a digital comparer.

The digital comparator circuit 60 is shown in FIG. 11, and it includes three comparator devices each having two inputs. Input "A" on the left side is received directly from the A0-A11 output of binary counter 53 of the analog to digital converter circuit 50 (FIG. 9). This represents the present battery voltage reading. Input "B" on the right side is obtained from the B0-B11 output of the single word storage register 55, representing the previous digital representation of battery voltage.

The digital comparator 60 comprises three separate, cascaded devices, 60a, 60b and 60c. The output of comparator 60c is in two forms: B greater than A and B equal to A. Either output applied to OR gate 61 will cause an output signal on line 63 to be applied to the consecutive sample circuit 65.

If the previous battery voltage (B0-B11) exceeds the present battery voltage (A0-A11), this is an indication that the battery is heating, and under these conditions, the charging operation will be discontinued.

An output from the B=A terminal of comparator 60c indicates that the present battery voltage does not exceed the previous battery voltage by more than the least significance bit. Therefore, the least significance bit is chosen to represent the predetermined battery voltage difference, and in the preferred embodiment this is set at 270 microvolts-per-minute-per-cell.

Figure 12:
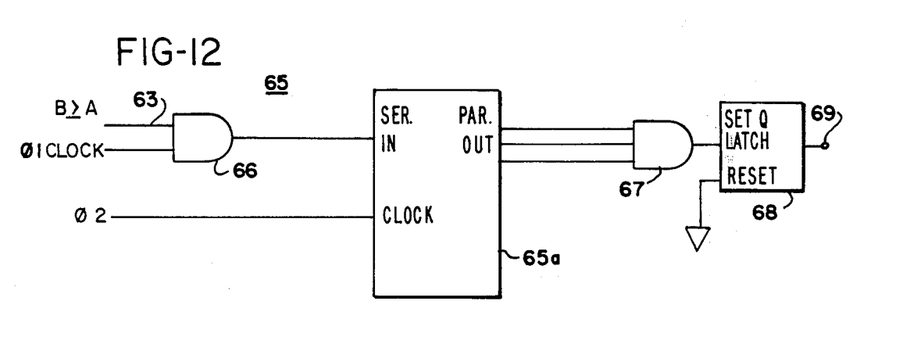
FIG. 12 is a block diagram showing a consecutive sample circuit.

The consecutive sample circuit 65 includes a counter (or preferably a serial shift register) 65a having a clock input triggered by the $\phi 2$ clock signal, and an input from the digital comparator circuit 60. The logic level of the signal on line 63 during the $\phi 1$ clock interval will be presented at the serial input to the counter 65a, and this logic level will be shifted into the counter upon the occurrence of the leading edge of the $\phi 2$ clock pulse. Counter 65 has a parallel output which represents the status of the signals in three adjacent registers, and whenever these three registers contain a logic high simultaneously, then gate 67 will pass a signal to latch or set the R-S latch 68, the output of which will provide the control signal on line 69 to the termination logic circuit 70. The R-S latch 68 is reset only after the battery has been disconnected from the charger.

There is no clock signal applied to the digital comparator 60 of FIG. 11. However, the output on line 63 is applied to AND gate 66 which is a part of the consecutive sample circuit 65 shown in FIG. 12. The other input to the AND gate is the $\phi 1$ clock signal. Therefore, only during the $\phi 1$ time period are the digital readings on the binary counter 53 and the single word storage registers 55 actually compared. The consecutive sample circuit includes a counter 65a which is triggered by the $\phi 2$ clock input. Whenever four consecutive input signals have been received, an output will be available from this device, and when applied to AND gate 67, will cause a monostable multivibrator 68 to be set. This will provide the termination signal on line 69 to the termination logic circuit 70.

Figure 16:
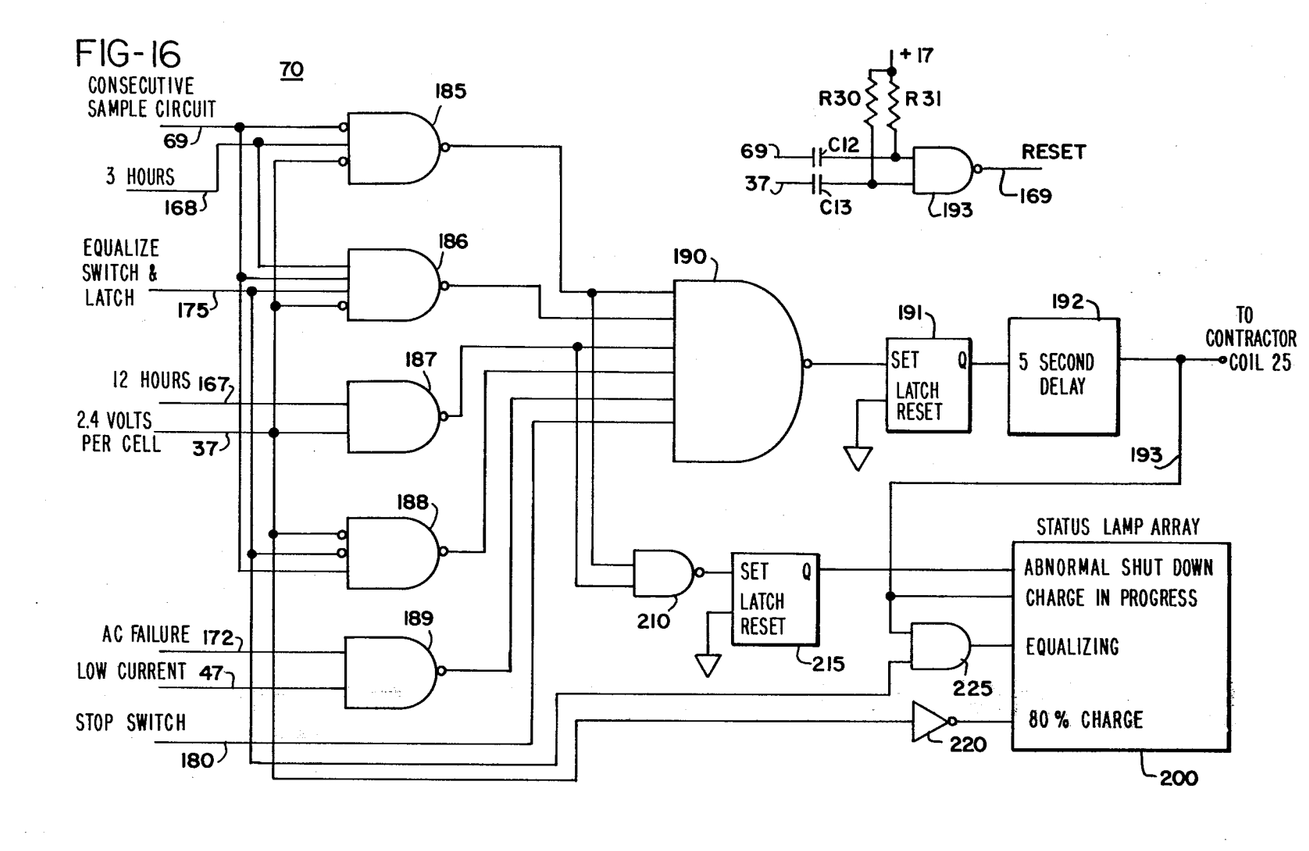
FIG. 16 is a schematic diagram of the termination logic circuit.

In addition to the output 69 of the consecutive sample circuit 65, the termination logic circuit 70 also receives termination signals from a counter circuit 160, an AC failure detection circuit 170, an equalized switch 175, an stop switch 180. Another input to the termination logic circuit is provided by the current amplifier and comparator circuit 45.

Figure 13:
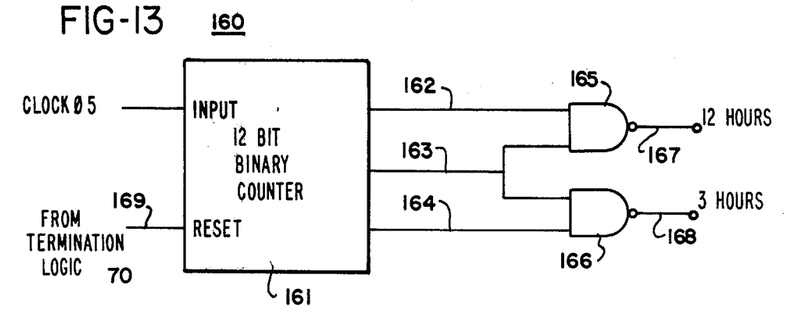
FIG. 13 is a schematic diagram of a counter circuit.

The counter circuit 160 is shown in FIG. 13 and includes a 12-bit binary counter 161. It has two inputs, a $\phi 5$ clock signal and a reset signal from the termination logic circuit. The counter has three output lines, 162, 163 and 164. Lines 162 and 163 are connected to the AND gate 165 and lines 163 and 164 are connected to AND gate 166. The lines 162-164 represent binary states within the counter, and whenever both lines 163 and 164 are high, an output will be provided by AND gate 166 on line 168, and this occurs 3 hours after a reset signal. Whenever lines 162 and 163 are high simultaneously, AND gate 165 will provide an output on line 167, and this occurs 12 hours following a reset signal. For reasons which will be explained hereinafter, both the 3 hour and 12 hour signals are used by the termination logic circuit 70.

Figure 14:
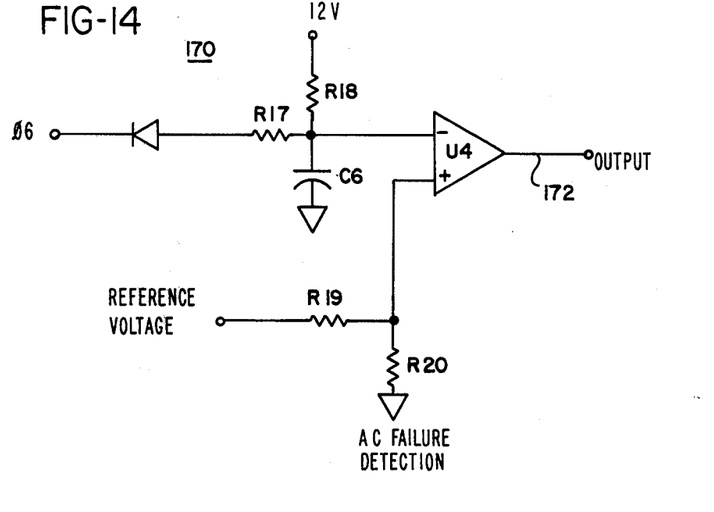
FIG. 14 is an electrical schematic diagram of an alternating current failure detector circuit.

FIG. 14 illustrates the AC failure detection circuit 170. This circuit has as an input a $\phi 6$ clock signal. As shown in FIG. 6, this is a square wave, 60 Hz signal, the output of the photon-coupled transistor 100. A 12 volt source of DC voltage is applied to one side of resistor R18 and resistor R17 and through diode D1 to the transistor 100 of FIG. 5, and therefore as long as a $\phi 6$ signal appears, the voltage across capacitor C7 will be held relatively low. Capacitor C7 is connected to the negative input of amplifier U4, an operational amplifier connected as a comparator. The positive input to the comparator is provided by a reference voltage through a voltage divider including resistors R19 and R20. Whenever the $\phi 6$ signal is lost, indicating a failure in the AC power supply, an output from amplifier U4 on line 172 will be applied to the termination logic circuit 70.

Figure 15:
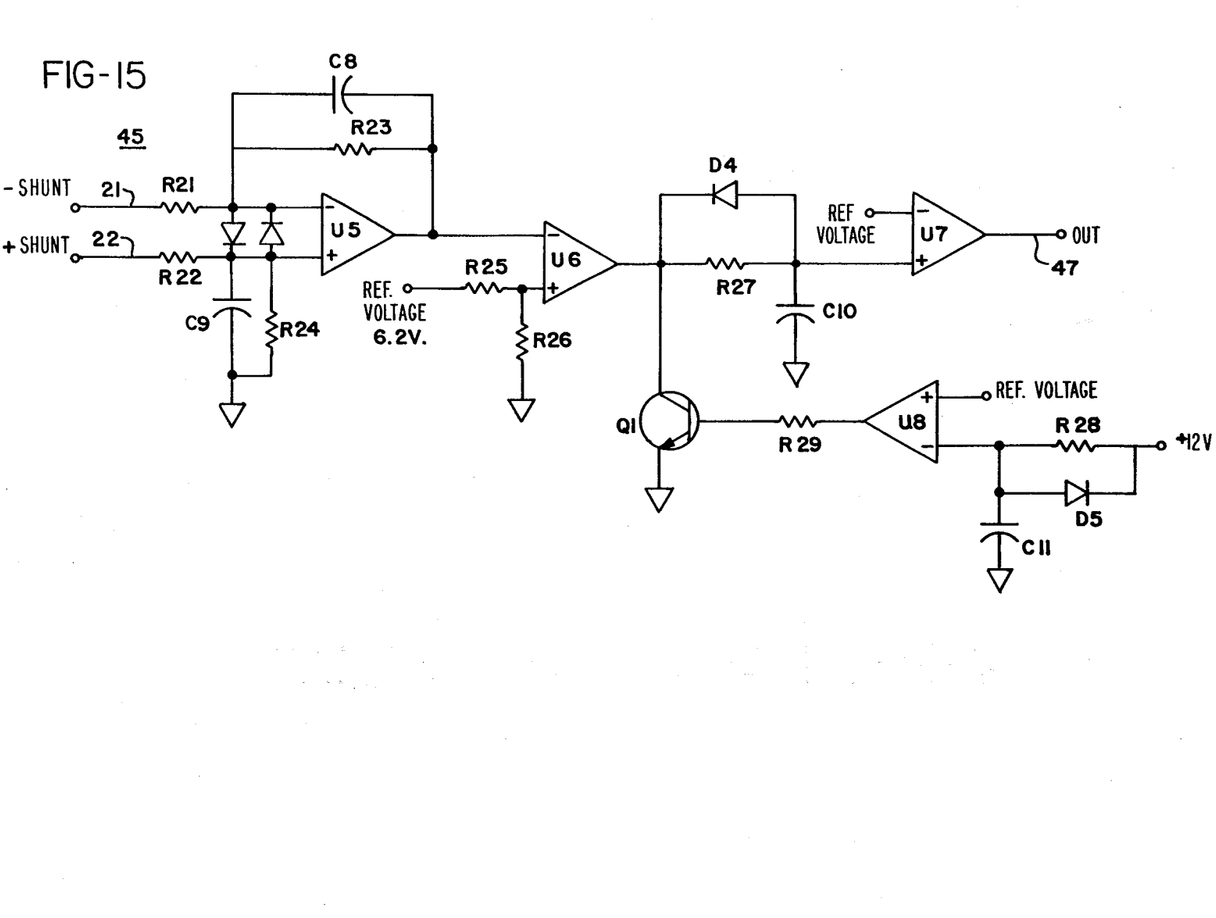
FIG. 15 is an electrical schematic diagram of a current amplifier and comparator circuit.

FIG. 15 is an electrical schematic diagram of a current amplifier and comparator circuit which senses the current flow to the battery 10 and therefore determines whether the battery is actually connected to the battery charger 15. The voltage across shunt 17 is applied through resistors R21 and R22 to operational amplifier U5 connected as a differential amplifier. Feedback is provided by resistor R23 and capacitor C8, and balanced compensation is provided by resistor R24 and capacitor C9. The output of the operational amplifier is applied to a comparator circuit U6. This device is provided with a reference from resistor R25 and R26. Diodes D2 and D3 are provided to protect the input of the differential amplifier U5.

The output of the comparator is connected to inverter U7 through resistor R27 and diode D4 and filter capacitor C10, and the output of the comparator U7 on line 47 is connected to one of the inputs in the termination logic circuit 70. Transistor Q1 pulls the output of the comparator U6 to ground for a period of 10 seconds whenever the battery is first connected to the operation of the circuit which includes amplifier U8, resistors R28 and R29, capacitor C5 and diode D5.

The termination logic circuit 70 is shown in FIG. 16 and includes a plurality of AND gates 185-189 some provided with inverting inputs, all provided with inverting outputs connected to a six input AND gate 190. The circuit of FIG. 16 is shown in positive logic form, however, some of the components are NAND gates, such as MC14011 devices, while the triple input AND gates are MC14073 devices.

The output of the AND gate 190 is applied through a multivibrator 191 and a five second delay circuit 192 (including a 6.8 megohm resistor and a 1.0 MFD capacitor) to control the coil of the contactor 25, and thus controls the charging of the battery 10.

The termination logic circuit 70 of FIG. 16 will cause charger termination under the following circumstances:

1. If the equalize switch 175 has not been set and the battery voltage is above 2.4 volts-per-cell, then upon the occurrence of four consecutive battery readings where the present battery voltage differs from the previous battery voltage by less than a predetermined amount, the contactor coil will be opened and the charging operation terminated. The is the normal shutdown mode.

2. If the equalize switch has been set and battery voltage is above 2.4 volts-per-cell, and four consecutive battery readings of less than the predetermined amount have been detected, then the battery charging will be terminated three hours after all of these events have occurred.

3. If twelve hours have elapsed, and the battery voltage has not reached 2.4 volts-per-cell, then the charging operation will be terminated since there is likely to be a fault in either the battery or the charger circuit.

4. If 3 hours has elapsed since 2.4 volts-per-cell was reached, and if four consecutive readings of less than a predetermined amount have not occurred, then the charging operation will be terminated. This is an indication of likely charger circuit failure.

5. If at any time the charger current drops below a minimum value, the charger will be immediately shut down since the battery has probably been prematurely disconnected or there is a failure in the battery or the charger circuit.

6. If the charger stop switch 180 is manually activated. This switch allows the operator to interrupt a charge at any time and to use the battery even before the charging cycle has been completed.

The termination logic circuit 70 includes a reset circuit comprising NAND gate 193 and pulse forming circuits, including capacitors C12, C13 and resistors R30, R31. The output or reset signal from this circuit is applied on line 169 to the counter 160 (FIG. 13) on the occurrence of either an input on line 69 from the consecutive sample circuit (FIG. 12) or on line 37 from the 2.4 volt-per-cell circuit (FIG. 8).

The status lamp array 200 provides to the operator a visual indication of the status of operation of the battery charger. A "charge in progress" lamp is illuminated by a signal on line 193 whenever power is applied to the contactor coil 25. An "Abnormal Shutdown" lamp will be illuminated whenever the S-R latch 215 has been set, and this will occur upon an output from either gate 185—indicating that the battery voltage has exceeded 2.4 volts, three hours have elapsed, but four consecutive voltage readings of less than the predetermined amount have not occurred—or an output from gate 187 which occurs whenever twelve hours have elapsed since the beginning of the charging operation and the battery voltage has not yet reached 2.4 volts.

The "80% Charge" lamp is responsive to a signal on the 2.4 volts-per-cell line 37 and the output of inverter 220. The "Equalizing" lamp is illuminated whenever power is applied to the contactor coil 25 and the equalizing switch 175 is closed. The equalizing mode adds three hours of charging time, and for some batteries, this is recommended for every five to ten charging operations.

Both latches 191 and 215 can only be reset by disconnecting the battery from the charging circuit since these devices receive their operating voltage from the battery circuit.

An identification of the components used in the preferred embodiment of the invention, along with their values, are given in the table below.

TABLE I

| Resistors | Ohms | Capacitors | MFD |
|---|---|---|---|
| R1 | 10K | C1 | 0.001 |
| R2 | 10K | C2 | 0.001 |
| R3 | 10K | C3 | 0.001 |
| R4 | 221K | C4 | 10.0 |
| R5 | 50K | C5 | 10.0 |
| R6 | 6.19K | C6 | 0.1 |
| R7 | 6.19K | C8 | 0.1 |
| R9 | 100K | C9 | 0.1 |
| R10 | 100K | C10 | 0.1 |
| R11 | 174K | C11 | 10.0 |
| R12 | 50K | C12 | 0.1 |
| R13 | 10K | C13 | 0.1 |
| R14 | 270K | | |
| R15 | 100K | | |
| R16 | 10K | | |
| R17 | 1K | | |
| R18 | 100K | | |
| R19 | 10K | | |
| R20 | 100K | | |
| R21 | 10K | | |
| R22 | 10K | | |
| R23 | 1M | | |
| R24 | 1M | | |
| R25 | 100K | | |
| R26 | 3.3K | | |
| R27 | 1M | | |
| R28 | 1M | | |
| R29 | 1K | | |
| R30 | 10K | | |
| R31 | 10K | | |

| | Other | |
|---|---|---|
| 51 | Voltage to Frequency Converter | LM331 |
| 52 | Frequency Divider | MC14040 |
| 53 | 11-Bit Binary Counter | MC14040 |
| 55a | 4-Bit Shift Register | MC14035 |
| 55b | 4-Bit Shift Register | MC14035 |
| 55c | 4-Bit Shift Register | MC14035 |
| 60a | Comparator | MC14585 |
| 60b | Comparator | MC14585 |
| 60c | Comparator | MC14585 |
| 65a | 4-Bit Shift Register | MC14035 |
| 68 | RS Latch | MC14043 |
| 100 | Photon-Coupled Transistor | MOC1005 |
| 110 | Frequency Divider | MC14040 |
| 120 | Monostable | NE555 |
| 130 | Schmitt Trigger Inverter | MC14584 |
| 135 | Monostable | NE556 |
| 140 | Monostable | NE556 |
| 161 | 12-Bit Binary Counter | MC14040 |
| 185 | AND Gate | MC14073 |
| 186 | AND Gate | MC14073 |
| 187 | AND Gate | MC14073 |
| 188 | AND Gate | MC14073 |
| 189 | AND Gate | MC14073 |
| 190 | AND Gate | CD4048 |
| 191 | RS Latch | MC14043 |
| 193 | NAND | MC14011 |
| U1-8 | Amplifier | LM324 |
| Q1 | Transistor | 2N3903 |
| 210 | NAND | MC14011 |
| 215 | S-R Latch | MC14043 |
| 220 | Inverter | MC14584 |
| 225 | AND | MC14073 |

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An automatic battery charging apparatus including,
   means for providing a source of regulated electrical current for charging a battery,
   means for sensing the battery voltage at regular intervals, said means including an analog to digital converter providing a digital output representative of average battery voltage taken over a predetermined period of time, means for comparing successive average battery voltage readings, means responsive to a predetermined number of consecutive comparisons where the present battery average differs from the previous average battery voltage by less than a predetermined amount for generating a control signal, and means responsive to said control signal for disconnecting said source of charging current from said battery.

2. The battery charging apparatus of claim 1 wherein said analog to digital converter comprises a voltage to frequency converter, a frequency divider, and a binary counter, whereby a digital output is provided from said binary counter taken over a predetermined interval of time.

3. An electrical circuit for controlling the operation of a regulated battery charger in response to the state of actual charge of a battery, including means for sensing voltage of the battery at regular intervals including an analog to digital converter providing a digital output representative of average battery voltage taken over a predetermined period of time, means for storing the digital representation of the previous average battery voltage, means for comparing the present average battery voltage with the previous average battery voltage, means responsive to a predetermined number of consecutive comparisons where the present battery average differs from the previous average battery voltage by less than a predetermined amount for generating a control signal, and means responsive to said control signal for disconnecting said battery charger from said battery.

4. The control circuit of claim 3 wherein said predetermined interval of time is in excess of one minute, and wherein said consecutive comparisons is at least three before generating a control signal.

* * * * *